United States Patent [19]
Kuze

[11] Patent Number: 5,282,609
[45] Date of Patent: Feb. 1, 1994

[54] PNEUMATIC COUNTERBALANCE STAY

[76] Inventor: Yoshikazu Kuze, 31-3, Higashimagome 1-chome, Ohta-ku, Tokyo, Japan

[21] Appl. No.: 993,591

[22] Filed: Dec. 22, 1992

[30] Foreign Application Priority Data

Dec. 24, 1991 [JP] Japan .................... 3-361171

[51] Int. Cl.$^5$ ............................... F16F 9/00
[52] U.S. Cl. ..................... 267/120; 267/64.11; 188/277
[58] Field of Search .............. 267/64.11, 120; 188/277, 284; 236/99 K

[56] References Cited

U.S. PATENT DOCUMENTS

| | | | |
|---|---|---|---|
| 2,723,006 | 11/1955 | Wyeth | 188/277 |
| 2,971,212 | 2/1961 | Voster et al. | 188/277 X |
| 4,176,786 | 12/1979 | Braukmann | 236/99 K |
| 4,408,751 | 10/1983 | Dodson et al. | |
| 4,595,046 | 6/1986 | Iino | 236/99 K X |
| 5,033,865 | 7/1991 | Kuze | 236/99 K X |

FOREIGN PATENT DOCUMENTS

| | | | |
|---|---|---|---|
| 1028438 | 4/1958 | Fed. Rep. of Germany | 188/284 |
| 2051858 | 5/1972 | Fed. Rep. of Germany | 188/277 |
| 3546236 | 7/1987 | Fed. Rep. of Germany | 267/64.11 |
| 27969 | 3/1977 | Japan | 188/277 |

*Primary Examiner*—Mark T. Le
*Attorney, Agent, or Firm*—Beveridge, DeGrandi, Weilacher & Young

[57] ABSTRACT

A partitioning body is fixed to an inner wall of a gas-charged cylinder to separate the cylinder into an actuating chamber and a pressure accumulating chamber, and a thermo-actuator is provided in the partitioning body. A plunger valve device comprising a plunger valve and a valve seat is provided in the partitioning body. A piston rod of a piston is slidably mounted in actuating chamber of the cylinder, an end of the piston rod is projected from the actuating chamber. The plunger valve is arranged to be engaged with the valve seat to close the plunger valve device when projected from the partitioning body by the thermo-actuator, and arranged to be disengaged from the valve seat to open the plunger valve device when retracted by the piston.

6 Claims, 6 Drawing Sheets

PNEUMATIC COUNTERBALANCE STAY

BACKGROUND OF THE INVENTION

The present invention relates to a temperature compensated pneumatic counterbalance stay, and more particularly to a stay which balances with a weight of a vertically pivotally operated closure unit such as a hatchback and hood of an automobile.

A counterbalance stay known as a gas spring is provided in an automobile for supporting a hatchback. The stay is extended when the hatchback is opened, and to the contrary, retracted when closed. Since the automobile is subjected to a wide range of ambient temperature, the pressure of the gas within a cylinder of the stay considerably varies. For example, in severe cold, the pressure of the gas is so reduced that the supporting force of the stay cannot hold the hatchback in the raised position. The disadvantage can be removed by increasing the initial pressure of the gas at charging. However, the gas pressure excessively rises under high temperature in summer, so that the hatchback cannot be lowered from the raised position without a large manual force. Consequently, it is desired that an improved counterbalance stay which is free of the disadvantage is provided.

U.S. Pat. No. 4,408,751 discloses a temperature compensated pneumatic counterbalance where a thermally actuated bimetallic disc valve is provided to compensate the change of pressure therein due to temperature variation. However, the bimetal has a small actuating force, and in addition, a low sensitivity.

An object of the present invention is to provide a pneumatic counterbalance stay wherein the pressure of gas in an expansible actuating chamber is decreased when the ambient temperature is increased, so that the closing unit held open can be easily closed.

According to the present invention, there is provided a pneumatic counterbalance stay comprising a cylinder charged with gas, a partitioning body fixed to an inner wall of the cylinder to separate the cylinder into an actuating chamber and a pressure accumulating chamber, a thermo-actuator provided in the partitioning body, the thermo-actuator having a heat conductive cylinder charged with wax pellets, a rubber seal bag secured to the conductive cylinder and provided in the wax pellets, and a rod axially slidably mounted in the cylinder and engaged with the seal bag and provided to be outwardly projected when ambient temperature is higher than a predetermined temperature, a plunger valve device provided in the partitioning body and comprising a plunger valve and a valve seat, the plunger valve being engaged with the rod of the thermo-actuator so as to be axially moved together with the rod and outwardly projected from the partitioning body, the valve seat being secured in the partitioning body adjacent the plunger valve, a piston rod connected to a piston slidably mounted in actuating chamber of the cylinder, an end of the piston rod being projected from the actuating chamber. The plunger valve is arranged to be engaged with the valve seat to close the plunger valve device when projected from the partitioning body by the thermo-actuator, and arranged to be disengaged from the valve seat to open the plunger valve device when retracted by a part of the piston.

In a feature of the present invention, the plunger valve has a large diameter portion and a small diameter portion, the valve seat is a cylindrical member around the plunger valve, the large diameter portion engages with the valve seat to close the plunger valve device.

These and other objects and features of the present invention will become more apparent from the following detailed description with reference to the accompanying drawings.

DETAILED DESCRIPTION OF THE PREFERRED EMBODIMENTS

Figure 1:
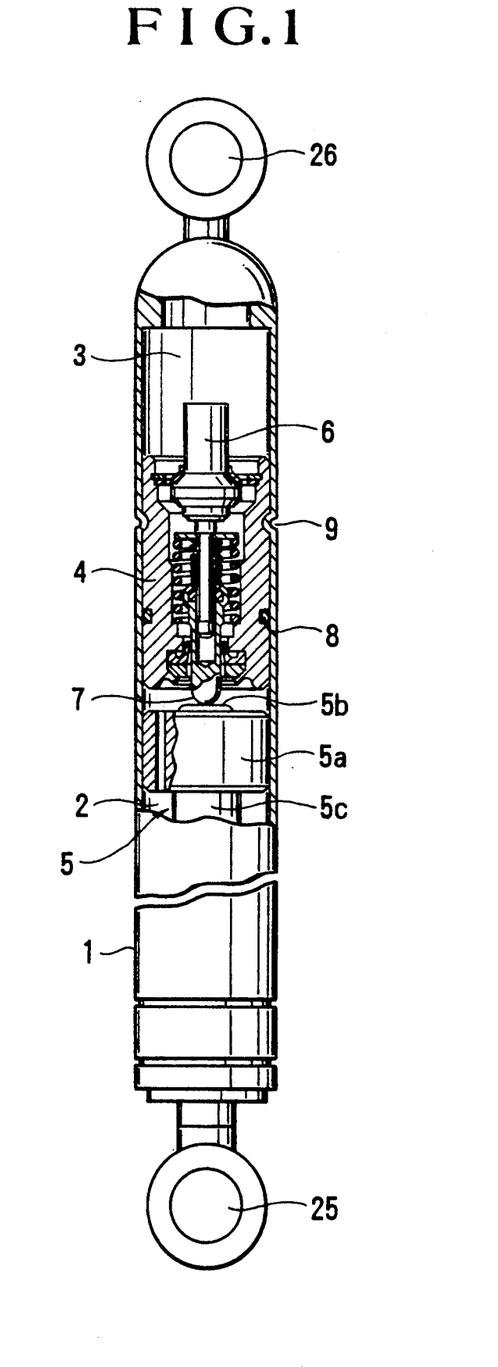
FIG. 1 is a partially sectional view of a temperature compensating pneumatic counterbalance stay according to the present invention.

Referring to FIG. 1, a pneumatic counterbalance stay according to the present invention comprises a hermetically sealed cylinder 1, a partitioning body 4 fixedly mounted in the cylinder 1 for hermetically dividing the inner space of the cylinder 1 into an expansible actuating chamber 2 and a pressure accumulating chamber 3, and a stainless steel piston rod 5 slidably mounted in the cylinder 1. A thermo-actuator 6 is fixed to the partitioning body 4 at the accumulator chamber side and a plunger valve device having a plunger valve 7 operated by the thermo-actuator 6 is mounted.

Figure 2:
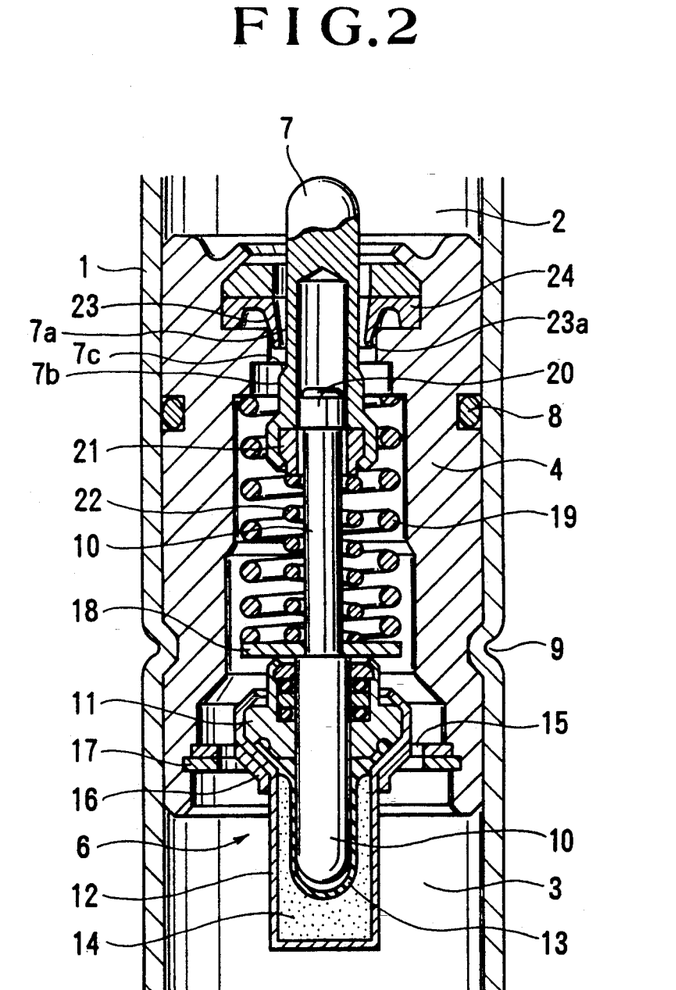
FIG. 2 is an enlarged sectional view showing a part of the stay when a plunger valve device therein is opened.

Referring to FIG. 2, the partitioning body 4 has an annular peripheral groove in which an O-ring 8 fits so as to be pressed against the inner wall of the cylinder 1. An annular rib 9 of the cylinder 1 engages with another annular groove of the body 4 to keep the body 4 in position, thereby hermetically dividing the actuating chamber 2 and the pressure accumulating chamber 3. The thermo-actuator 6, which is the same as a thermo-actuator used in a cooling system of an automotive engine, comprises a heat conductive cylinder 12, a guide member 11 secured to the inside wall of the cylinder 12, a steel rod 10 slidably mounted in the guide member 11, and a rubber seal bag 13. Wax pellets 14 are filled in the cylinder 12. To the cylinder 12 is attached a retainer 16 having a plurality of vents 15. The retainer 16 engages with an annular groove formed in the inner wall of the body 4 and secured thereto by a C-ring 17.

A return spring 19 is disposed in a space formed in the body 4 between a spring retainer 18 securely mounted on the rod 10 and an inner shoulder of of the body 4, thereby urging the rod toward the cylinder 12. The rod 10 is projected from the cylinder 12 and a collar 20 is fixed at an end of the rod 10. The collar 20 slidably engages with an axial hole of the cylindrical plunger valve 7. A ring 21 securely attached to the plunger valve 7 is slidably engaged with the rod 10 and prevented from disengaging therefrom by the collar 20. A spring 22 is provided between the ring 21 and the spring retainer 18, thereby forcing the plunger valve 7 to project out of the body 4.

Figure 5:
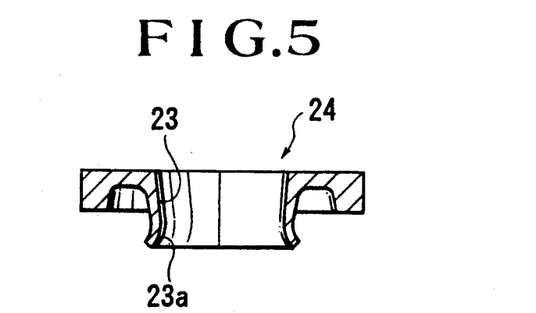
FIG. 5 is a sectional view of a valve seat of the valve device.

The plunger valve device 7 has an annular elastic nonreturn valve seat 24. The plunger valve 7 has a small diameter portion 7a, a large diameter portion 7b and a taper portion 7c between the small diameter and large diameter portions 7a and 7b. On the other hand, the valve seat 24 is securely mounted inside the body 4 thereby to surround the plunger valve 7. As shown in FIG. 5, the valve seat 24 has a projecting seat portion 23 with which the large diameter portion 7b of the plunger valve 7 engages to close the plunger valve device. The seat portion 23 is adapted to flare outwardly to form an introducing port 23a so that the plunger valve 7 may easily enter therein. The end of the port does not contact the inside wall of the body 4.

Figure 4:
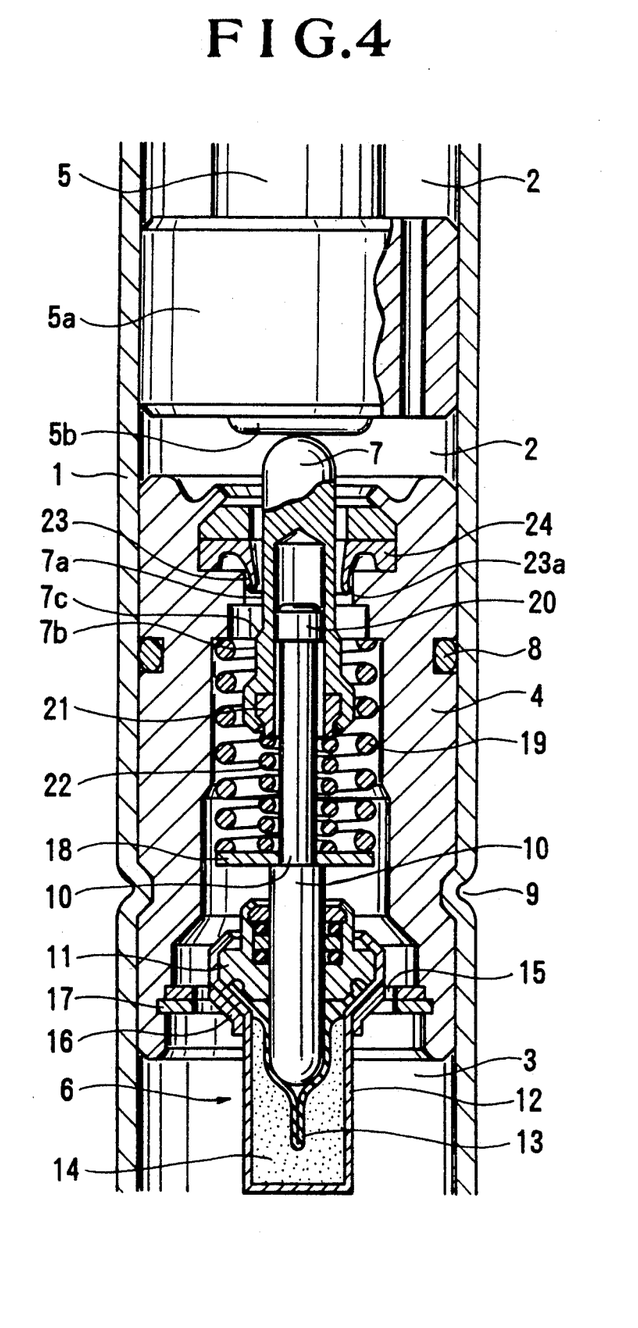
FIG. 4 is an enlarged sectional view showing the part of the stay when the valve device is opened by a piston.

The end of the plunger valve 7 opposite to the ring 21 is projected out of the body 4. In a high temperature range, the projected plunger valve is pushed by a projection 5b of a piston 5a to open the valve as shown in FIG. 4.

Figure 6:
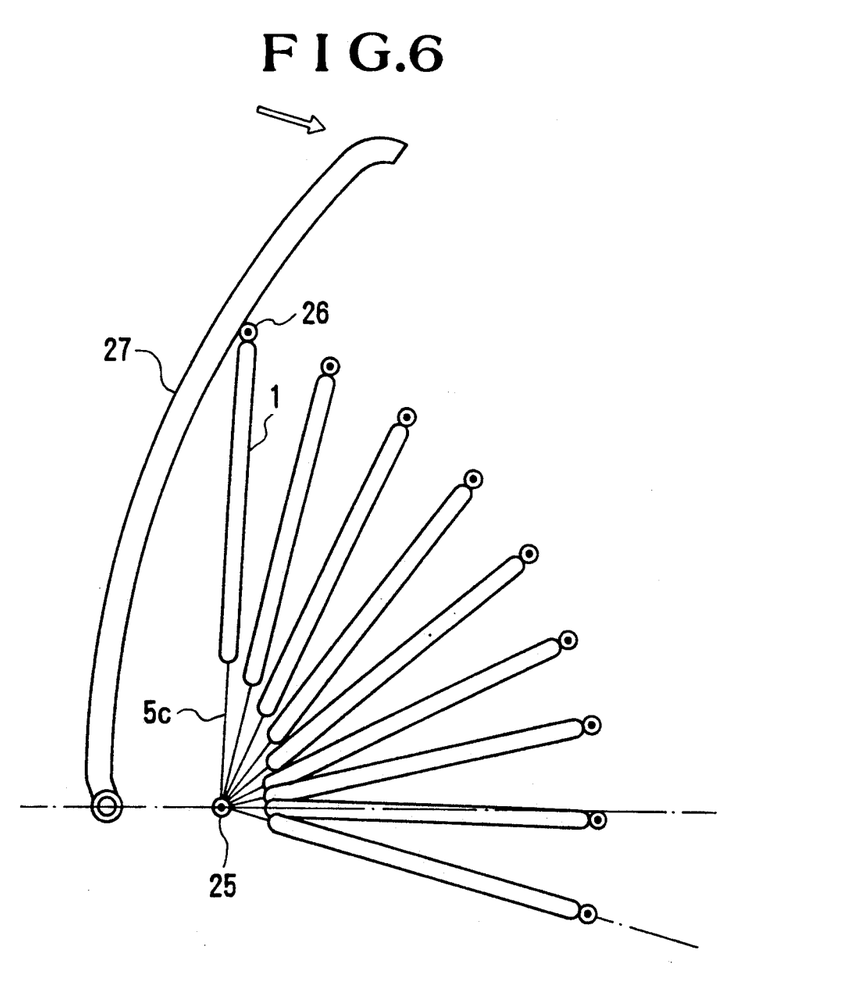
FIG. 6 is an illustration showing the operation of the stay when applied to an automobile with a hatchback.

The pneumatic counterbalance stay of the present embodiment is intended to be used as a support for a hatchback of an automobile. Referring back to FIG. 1, a rod 5c of the piston rod 5 is projected out of the cylinder 1 and is pivotally mounted on a body of the automobile at an annular connecting member 25 as shown in FIG. 6. On the other hand, the other end of the cylinder 1 is pivotally connected to a hatchback 27 of the automobile at an annular connecting member 26. The cylinder 1 is charged with gas such as air and nitrogen at a high pressure.

It is assumed that the range of ambient temperature wherein the pneumatic counterbalance stay of the present invention may be applied is between $-40°$ C. and $60°$ C. The range between $-40°$ C. and $0°$ C. is called a low temperature range and the range between $20°$ C. and $60°$ C. is called a high temperature range hereinafter. In the low temperature range, the thermo-actuator 6 is inoperative so that the rod 10 thereof is kept in the retracted position as shown in FIG. 2. The plunger valve 7 is accordingly retracted in the body 4 in a position where the small diameter portion 7a faces the seat portion 23 of the elastic nonreturn valve seat 24 without contact. Hence the valve is opened. As a result, the actuating chamber 2 and the pressure accumulating chamber 3 are communicated with each other through the space in the body 4.

Figure 3:
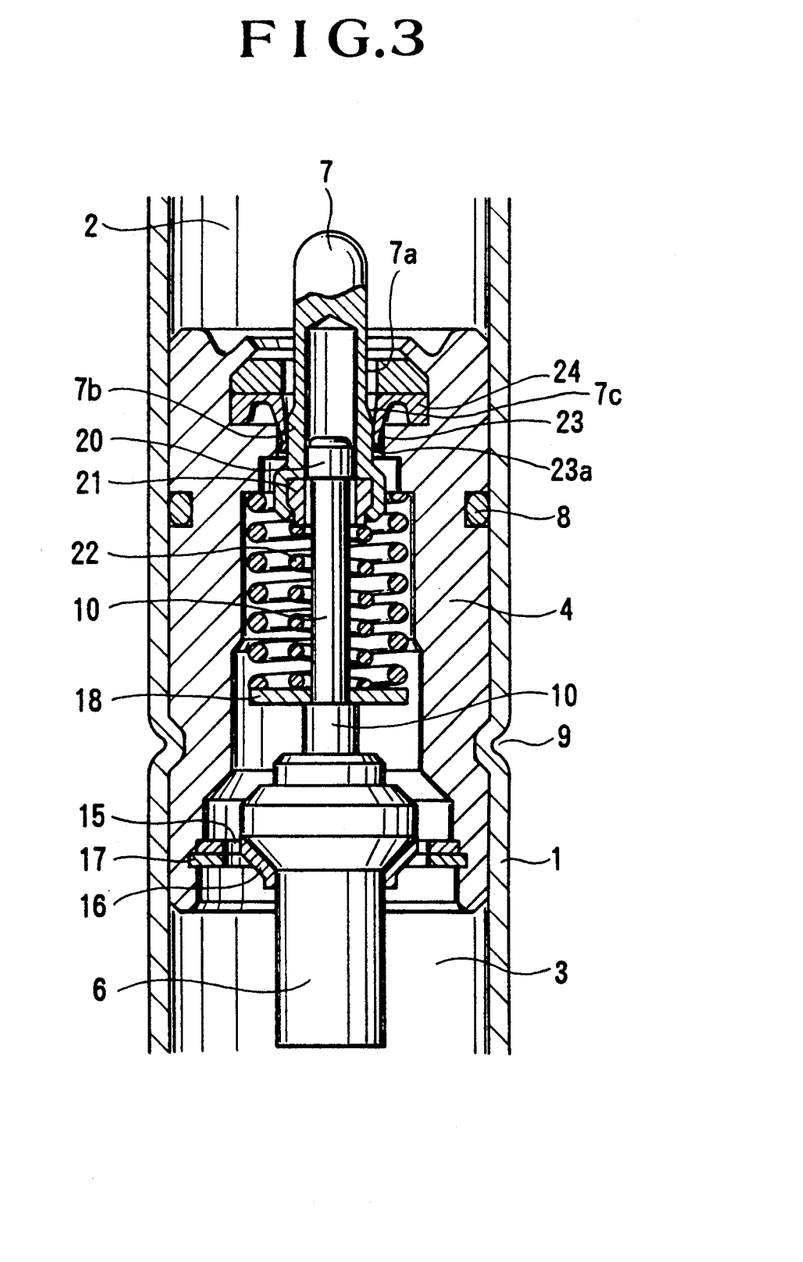
FIG. 3 is an enlarged sectional view showing the same part of the stay when the plunger valve device is closed in accordance with a high ambient temperature.

The thermo-actuator 6 starts to actuate at the temperature of $0°$ C. As the wax pellets 14 in the cylinder 12 expand, the rod 10 is caused to be upwardly moved so as to push the plunger valve 7 toward the elastic valve seat 24. When the ambient temperature reaches $20°$ C., the large diameter portion 7b of the plunger valve 7 fits in the seat portion 23 of the valve seat 24, thereby closing the valve as shown in FIG. 3. Accordingly the pressure accumulating chamber 3 is separated from the actuating chamber 2.

In the condition where the hatchback 27 is closed, the piston rod 5 is retracted, so that the projection 5b of the piston 5a pushes the plunger valve 7 into the body 4. When opening the hatchback 27, the piston rod 5 projects to allow the plunger valve 7 to project out of the body 4 as shown in FIG. 2.

Referring to FIG. 4, when the hatchback 27 is completely closed, the pneumatic counterbalance stay is contracted so that the projected member 5b of the piston 5a forces the plunger valve 7 into the body 4 to disengage the large diameter portion 7b from the seat portion 23. Consequently, the actuating chamber 2 and the pressure accumulating chamber 3 are communicated, rendering the pressures therein equal with each other. When the hatchback 27 starts to open, the piston rod 5 releases the plunger valve 7. In the high temperature range, the plunger valve 7 is projected by the thermo-actuator 6 so that the large diameter portion 7b engages with the valve seat 23, thereby closing the valve. As the hatchback 27 is opened, the actuating chamber 2 expands, so that the pressure therein decreases.

When the hatchback 27 is completely opened, the gas pressure becomes minimum. Therefore, the hatchback can be easily closed. At the beginning of the closing of the hatchback, the reaction of the hatchback is somewhat large, since the hatchback is substantially upright as shown in FIG. 6. However, the reaction decreases immediately thereafter due to the leverage of the hatchback 27. After the hatchback is halfway closed, the reaction further decreases, and when further lowered, the hatchback can be closed by its dead weight. Although the same can be said for the conventional stay, the hatchback using the stay of the present invention can be closed with less manual force at the start of the closing because of the low gas pressure in the actuating chamber 2.

In the above described embodiment, the projected member 5b of the piston 5a is integral with the piston. Therefore, if the piston rod 5 is further downwardly moved from the position shown in FIG. 4 because of manufacturing and/or adjustment error, the spring 22 is completely compressed where the coils of the spring are contacted with each other. If the piston rod is further moved from the complete compression state, the thermo-actuator 6 is broken. In order to solve such a trouble, the compressible length of the spring 22 is increased to absorb the excessive stroke of the piston rod.

Figure 7:
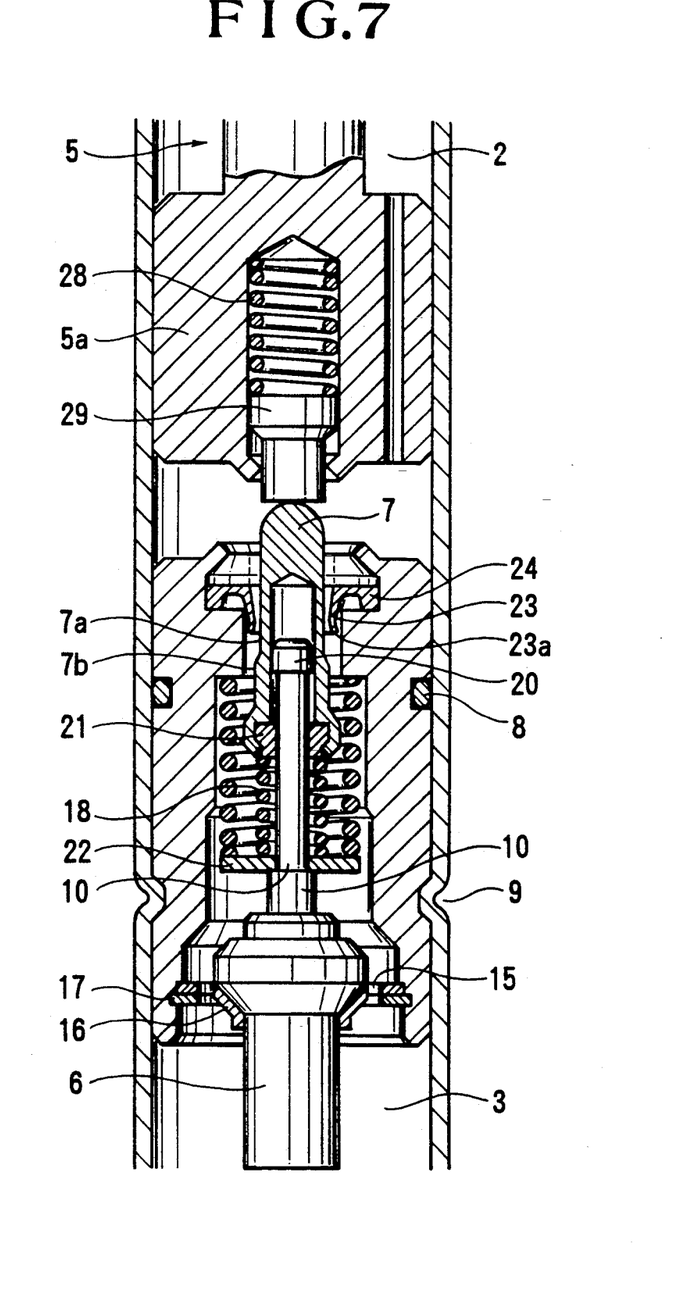
FIG. 7 is a sectional view showing a main part of another embodiment of the present invention.

FIG. 7 shows another embodiment for absorbing the excessive movement of the piston rod. The piston 5a has an axial bore in which a plunger 29 is slidably mounted, and a spring 28 is provided to outwardly urge the plunger 29. A stopper is provided for preventing the plunger from being ejected. Other parts of the stay are the same as the previous embodiment and identified by the same references as those of the figures. The torsional shearing stress of the spring 28 is set to a value larger than the spring 22 and smaller than the projecting force of the rod 10 of the thermo-actuator 6. Therefore, the plunger 29 pushes the plunger valve 7 to the complete compression state of the spring 22. Thereafter, the plunger 29 is retracted by the rod 10 of the thermo-actuator 6. Thus, the excessive movement of the piston rod 5 is absorbed. Consequently, the breakdown of the thermo-actuator is prevented, and the adjustment of the opening of the plunger valve becomes easy.

In an example of the pneumatic counterbalance stay, the actuating chamber 2 has a volume of 61 cc when fully expanded and 45 cc when contracted, and the pressure accumulating chamber 3 has a volume of 45 cc. Nitrogen is charged in the cylinder 1 at 50 kg/cm$^2$ under the ambient temperature of $5°$ C. In the low temperature range between $-40°$ and $10°$ C., the plunger valve 7 is opened, so that the actuating chamber 2 is communicated with the pressure accumulating chamber 3. At the ambient temperature of $-40°$ C., the pressure in the chambers 2 and 3 is calculated as, $$50 \text{ kg/cm}^2 \times (273-40) \div (273+5) = 41.9 \text{ kg/cm}^2$$

When the hatchback is closed at the temperature, the pressure increases to $$41.9 \text{ kg/cm}^2 \times 106 \div 90 = 49.3 \text{ kg/cm}^2$$

and returns when opened to $$49.3 \text{ kg/cm}^2 \times 90 \div 106 = 41.9 \text{ kg/cm}^2$$

In the high temperature range between 20° C. and 60° C., the plunger valve 7 is closed. However, during the closing of the hatchback, the projection 5b pushes the plunger valve 7 to open the valve, so that the actuating chamber 2 and the pressure accumulating chamber 3 are communicated with each other to equalize the pressure in the chamber 2 to that of the chamber 3. When the hatchback begins to open, the chambers become separated, and hence the high pressure is accumulated in the accumulator chamber 3. As the hatchback is further lifted, the volume of the actuating chamber 2 is expanded to decrease the pressure therein.

Namely at 20° C., the gas pressure in the cylinder 1 increases to 52.7 kg/cm$^2$. When the hatchback is closed, the pressure in both chambers 2 and 3 is calculated as follows.

$$52.7 \text{ kg/cm}^2 \times 106 \div 90 = 62 \text{ kg/cm}^2$$

When the hatchback 27 is completely opened, the pressure in the actuating chamber 2 separated from the pressure accumulating chamber 3 decreases as follows.

$$62 \text{ kg/cm}^2 \times 45 \div 61 = 45.7 \text{ kg/cm}^2$$

The following table shows more in detail, the change of gas pressure in the actuating chamber 2 in accordance with the ambient temperature, wherein values in column a indicate pressures in the embodiment of the present invention and those in column b pressures in a conventional device.

TABLE

| Ambient Temperature °C. | Gas Pressure kg/cm$^2$ | Gas Pressure When Hatchback Fully Opened kg/cm$^2$ | | Difference a − b |
|---|---|---|---|---|
| | | a | b | |
| −40 | 41.9 | 41.9 | 41.9 | 0 |
| −30 | 43.7 | 43.7 | 43.7 | 0 |
| −20 | 45.5 | 45.5 | 45.5 | 0 |
| −10 | 47.3 | 47.3 | 47.3 | 0 |
| 0 | 49.1 | 49.1 | 49.1 | 0 |
| +10 | 50.9 | 50.9 | 50.9 | 0 |
| +20 | 52.7 | 45.7 | 52.7 | −7.0 |
| +30 | 54.5 | 47.3 | 54.5 | −7.2 |
| +40 | 56.3 | 48.9 | 56.3 | −7.4 |
| +50 | 58.0 | 50.4 | 58.0 | −7.6 |
| +60 | 59.9 | 52.0 | 59.9 | −7.9 |

As indicated by the lines in the table, in the high temperature range between 20° C. and 60° C., the pressure in the actuating chamber 2 when the hatchback is completely opened decreases an amount corresponding to the difference of 40° C. For example, the pressure in the actuating chamber of the stay of the present invention at 30° C. during summer is the same as that at −10° C. in the conventional stay.

From the foregoing, it will be understood that the present invention provides a pneumatic counterbalance stay wherein the pressure in an actuating chamber is significantly decreased even if the ambient temperature is high. Therefore, if the present invention is employed as a support of a hatchback of an automobile, the pressure in the actuating chamber is decreased when the hatchback is completely opened. Hence the hatchback provided with the pneumatic counterbalance stay of the present invention is advantageous in that the hatchback can be easily operated in intense heat as well as in severe cold.

While the invention has been described in conjunction with preferred specific embodiments thereof, it will be understood that this description is intended to illustrate and not limit the scope of the invention, which is defined by the following claims.

What is claimed is:

1. A pneumatic counterbalance stay comprising:
   a cylinder charged with gas;
   a partitioning body fixed to an inner wall of the cylinder to separate the cylinder into an actuating chamber and a pressure accumulating chamber;
   a thermo-actuator provided in the partitioning body, the thermo-actuator having a heat conductive cylinder charged with wax pellets, a rubber seal bag secured to the conductive cylinder and provided in the wax pellets, and a rod axially slidable mounted in the cylinder and engaged with the seal bag and provided to be outwardly projected when ambient temperature is higher than a predetermined temperature;
   a plunger valve device provided in the partitioning body and comprising a plunger valve and a valve seat;
   the plunger valve being engaged with the rod of the thermo-actuator so as to be axially moved together with the rod and outwardly projected from the partitioning body;
   the valve seat being secured in the partitioning body adjacent the plunger valve;
   a piston rod having a piston slidable mounted in actuating chamber of the cylinder, an end of the piston rod being projected from the actuating chamber,
   the piston having a projected member on a side opposite to the piston rod,
   the plunger valve being arranged to be engaged with the valve seat to close the plunger valve device when projected from the partitioning body by the thermo-actuator, and disposed at such a position where the plunger valve is pushed by the projected member of the piston when the piston rod is retracted into the cylinder, so that the plunger valve is disengaged from the valve seat to open the plunger valve device.

2. A pneumatic counterbalance stay according to claim 1 wherein
   the plunger valve has a large diameter portion and a small diameter portion, the valve seat is a cylindrical member around the plunger valve, the large diameter portion engages with the valve seat to close the plunger valve device.

3. A pneumatic counterbalance stay according to claim 1 wherein
   the plunger valve is slidably mounted on the rod of the thermo-actuator so as not to be removed from the rod.

4. A pneumatic counterbalance stay according to claim 1 wherein
   the valve seat has a flared introduction port to receive an end of the plunger valve.

5. A pneumatic counterbalance stay according to claim 1 further comprising a plunger axially slidably mounted in the piston, and a spring outwardly urging the plunger so as to be engaged with an end of the plunger valve.

6. A pneumatic counterbalance stay according to claim 3 further comprising a spring provided for outwardly projecting the plunger valve, and a return spring provided for returning the rod.

* * * * *